(12) United States Patent
Kim et al.

(10) Patent No.: US 9,428,644 B2
(45) Date of Patent: Aug. 30, 2016

(54) ASA GRAFT COPOLYMER COMPOSITION

(71) Applicant: LG CHEM, LTD., Seoul (KR)

(72) Inventors: Min Jung Kim, Daejeon (KR); Yong Yeon Hwang, Daejeon (KR); Chun Ho Park, Daejeon (KR); Hye Kyung Han, Daejeon (KR); Sang Mi Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/118,593

(22) PCT Filed: Feb. 1, 2013

(86) PCT No.: PCT/KR2013/000853
§ 371 (c)(1),
(2) Date: Nov. 19, 2013

(87) PCT Pub. No.: WO2013/115610
PCT Pub. Date: Aug. 8, 2013

(65) Prior Publication Data
US 2014/0107276 A1    Apr. 17, 2014

(30) Foreign Application Priority Data

Feb. 3, 2012 (KR) .......................... 10-2012-0011513
Aug. 27, 2012 (KR) .......................... 10-2012-0093568
Feb. 1, 2013 (KR) .......................... 10-2013-0012050

(51) Int. Cl.
| | |
|---|---|
| C08F 290/04 | (2006.01) |
| C08G 63/48 | (2006.01) |
| C08L 69/00 | (2006.01) |
| C08L 67/02 | (2006.01) |
| C08F 265/04 | (2006.01) |
| C08L 51/06 | (2006.01) |

(52) U.S. Cl.
CPC .............. *C08L 69/00* (2013.01); *C08F 265/04* (2013.01); *C08L 51/06* (2013.01); *C08L 67/02* (2013.01)

(58) Field of Classification Search
CPC ...... C08L 69/00; C08L 51/06; C08F 265/04; C08F 279/06; C08J 5/00

USPC .............................................. 524/504; 525/67
See application file for complete search history.

(56) References Cited

U.S. PATENT DOCUMENTS

| | | | | |
|---|---|---|---|---|
| 4,912,162 A | * | 3/1990 | Kishida et al. | 525/67 |
| 2007/0021557 A1 | | 1/2007 | Lee et al. | |
| 2007/0287799 A1 | * | 12/2007 | Ha et al. | 525/71 |

FOREIGN PATENT DOCUMENTS

| | | | |
|---|---|---|---|
| CN | 101006134 A | | 7/2007 |
| JP | 56-099247 A | | 8/1981 |
| JP | 5-194830 A | | 8/1993 |
| JP | 5-222140 A | | 8/1993 |
| JP | 1997-189898 A | | 7/1997 |
| JP | 2004244518 | | 9/2004 |
| KR | 1020050071873 | | 7/2005 |
| KR | 1020070019411 | | 2/2007 |
| KR | 100785612 | | 12/2007 |
| KR | 1020070117315 | | 12/2007 |
| KR | 10-2007-0019411 | * | 4/2008 |
| KR | 1020100113841 | | 10/2010 |
| KR | 1020100132235 | | 12/2010 |
| KR | 1040827 | * | 6/2011 |
| WO | 2004/058839 A1 | | 7/2004 |
| WO | 2007-027038 A1 | | 3/2007 |

OTHER PUBLICATIONS

Machine Translation of KR 10-2007-0019411, Park et al, Apr. 15, 2008, p. 1-16.*

* cited by examiner

*Primary Examiner* — Susannah Chung
*Assistant Examiner* — Robert T Butcher
(74) *Attorney, Agent, or Firm* — Dentons US LLP

(57) ABSTRACT

Disclosed are an ASA graft copolymer having a structure including a seed which comprises at least one compound of an aromatic vinyl compound, a vinyl cyan compound and an alkyl (meth)acrylate compound, a core which surrounds the seed and comprises alkyl acrylate, and a shell which surrounds the core, comprises an aromatic vinyl compound, a vinyl cyan compound and a crosslinking agent, and having suitably controlled thicknesses and refractive indexes of the respective layers, and an ASA graft copolymer composition comprising the ASA graft copolymer.

7 Claims, No Drawings

ASA GRAFT COPOLYMER COMPOSITION

This application is a national stage entry of International Application No. PCT/KR2013/000853, filed on Feb. 1, 2013, which claims priority to Korean Patent Application Nos. 10-2012-0011513, filed on Feb.3, 2012; 10-2012-0093568, filed on Aug. 27, 2012; and 10-2013-0012050, filed on Feb. 1, 2013, with the Korean Patent Office, all of which are incorporated herein in their entirety by reference.

TECHNICAL FIELD

The present invention relates to an ASA graft copolymer composition. More specifically, the present invention relates to an ASA graft copolymer composition with superior thermal stability which comprises a graft copolymer having a structure including at least three layers and thus exhibits superior room-temperature and low-temperature impact strength and excellent appearance through control of refractive index and gel content.

BACKGROUND ART

Polycarbonate resins are known to exhibit superior impact resistance, transparency, strength, flame retardancy, electrical properties and heat resistance and are widely used for electric and electrical articles including automobiles and demand therefor is increasing. However, the polycarbonate resin has disadvantages of inherently high melt viscosity, poor moldability and considerably great thickness-dependent impact resistance as well as poor chemical resistance. Accordingly, in order to solve high melt viscosity of polycarbonate, an alloy product of polycarbonate with acrylonitrile-butadiene-styrene or acrylonitrile-acrylate-styrene may be used. In order to enhance chemical resistance of polycarbonate, polycarbonate may be used in combination with a resin such as polybutylene terephthalate.

An impact resistance enhancer having a core-shell structure has been used to enhance impact resistance, chemical resistance, processability and weather resistance of thermoplastic resins. Although application thereof is currently limited to enhancement of impact resistance of polyvinyl chloride, impact resistance enhancers having a core-shell structure are gradually expanding to polycarbonate resins, alloys of polycarbonate with acrylonitrile-butadiene-styrene or acrylonitrile-acrylate-styrene and engineering plastic resins such as polycarbonate-polybutylene terephthalate resins.

European Patent No. 465,792 discloses a resin composition prepared by mixing a polymer which comprises, as a main component, a rubber acrylic monomer which improves impact resistance of polycarbonate and exhibits uniform coloring when used in combination with a pigment, with polycarbonate.

Korean Patent Laid-open No. 2004-0057069 discloses use of an acrylic impact resistance enhancer with a multilayer structure comprising a seed prepared from a vinyl aromatic monomer and a hydrophilic monomer, an alkyl acrylate-based rubber core and an alkyl methacrylate-based shell for enhancing impact resistance and coloring property of engineering plastics.

However, when an impact resistance enhancer comprising an acrylic rubber component as a core substance is used for a resin having a high refractive index such as polycarbonate, a difference in refractive index between a target matrix resin and the impact resistance enhancer is great and processed products suffer from haze or are non-transparent when injected into the processed products due to large size of several hundreds of nanometers (nm), and enhancement effect of coloring property is insufficient and improvement of coloring property is limited.

DISCLOSURE

Technical Problem

Therefore, it is one object of the present invention to provide an ASA graft copolymer composition with superior room-temperature and low-temperature impact strength, excellent appearance and superior thermal stability, which comprises a graft copolymer having a tri-layer structure and having a refractive index and a gel content controlled in consideration of a refractive index of a target matrix polymer.

Technical Solution

In accordance with one aspect of the present invention, the above and other objects can be accomplished by the provision of an ASA graft copolymer composition comprising: an ASA graft copolymer comprising a seed, a core and a shell; and a matrix polymer, wherein the ASA graft copolymer has a gel content higher than 85% and a swelling index lower than 8, a difference in the refractive index ($\mu D^{25}$) between the seed of the ASA graft copolymer and the matrix polymer is lower than 0.06 and a difference in the refractive index ($\mu D^{25}$) between the core of the ASA graft copolymer and the matrix polymer is higher than 0.05.

In addition, a difference in the refractive index ($\mu D^{25}$) between the shell of the ASA graft copolymer and the matrix polymer is 0.05 or less.

In addition, the core of the ASA graft copolymer has a thickness of 20 to 50 nm.

In addition, the core of the ASA graft copolymer has a size of 150 to 350 nm.

In one embodiment, the shell of the ASA graft copolymer comprises a crosslinking agent.

In another embodiment, the shell of the ASA graft copolymer comprises an aromatic vinyl compound, a vinyl cyan compound and a crosslinking agent.

In another embodiment, the ASA graft copolymer comprises: a seed which comprises at least one of an aromatic vinyl compound, a vinyl cyan compound and an alkyl (meth)acrylate compound, and has a difference in refractive index ($\mu D^{25}$) between a target matrix polymer and the seed of 0.05 or less; a core which surrounds the seed, comprises alkyl acrylate, has a thickness of 20 to 50 nm and a thickness from the center thereof to the core of 75 to 175 nm, and has a difference in refractive index ($\mu D25$) between the target matrix polymer and the core, of 0.07 or more; and a shell which surrounds the core, comprises an aromatic vinyl compound, a vinyl cyan compound and a crosslinking agent, and has a difference in refractive index ($\mu D^{25}$) between the target matrix polymer, of 0.05 or more, wherein the ASA graft copolymer has a gel content of 92 to 98% and a swelling index of 2 to 7.

In addition, in one embodiment, the matrix polymer is at least one selected from the group consisting of a polycarbonate resin, an acrylonitrile-styrene copolymer, a polyester resin and a vinyl chloride resin.

In another embodiment, the matrix polymer is at least one selected from the group consisting of polycarbonate, a polycarbonate/acrylonitrile-styrene alloy, a polycarbonate/polybutylene terephthalate alloy and a vinyl chloride resin.

A weight ratio of the ASA graft copolymer to the matrix polymer is 0.1:99.9 to 99.9:0.1, 1:99 to 40:60, 1:99 to 30:70, or 2:98 to 20:80.

The ASA graft copolymer means an acrylate-styrene-acrylonitrile graft copolymer which is a type of graft copolymer, which comprises an acrylate monomer, a styrene monomer (aromatic vinyl compound) and an acrylonitrile monomer.

Hereinafter, the present invention will be described in detail.

The present invention provides an ASA graft copolymer that maintains a conventional impact resistance, does not suffer from deterioration in coloring property due to seed refractive index similar to a target matrix polymer, exhibits improved coloring property and thus superior appearance through control of rubber morphology of the core having a great difference in refractive index between the matrix and the core, and has thermal stability through control of refractive indexes of a seed, core and shell as well as gel content and swelling index.

The ASA graft copolymer according to the present invention comprises: a seed which comprises at least one of an aromatic vinyl compound, a vinyl cyan compound, and an alkyl (meth)acrylate compound; a rubber core which surrounds the seed and comprise alkyl acrylate; and a shell which surrounds the core and comprises an aromatic vinyl compound, a vinyl cyan compound and a crosslinking agent.

A weight ratio of the seed to the core to the shell constituting the acrylic graft copolymer is particularly preferably (5 to 40):(20 to 60):(20 to 60), in view of maintenance of suitable impact resistance and improvement of coloring property. When the content of the seed is low, appearance is bad, and when the content of the seed is excessive, impact resistance is deteriorated.

In addition, when the acrylic graft copolymer comprises the core in an amount lower than the range defined above, rubber content is low and enhancement of impact resistance of a graft copolymer is deteriorated, and when the acrylic graft copolymer has a rubber content exceeding the range defined above and a shell content lower than the range, rubber particles may be clumped during aggregation, and suffer reduction of enhancement effects of impact resistance and do not obtain a desired level of refractive index due to considerably low compatibility with resins.

The alkyl acrylate contained in the core may be methyl acrylate, ethyl acrylate, propyl acrylate, butyl acrylate, hexyl acrylate, octyl acrylate, 2-ethylhexyl acrylate or the like. Specifically, the alkyl acrylate may be n-butyl acrylate, 2-ethylhexyl acrylate or the like.

The core may be an acrylic rubber and is for example a rubber produced by polymerizing alkyl acrylate with a cross-linking agent.

When a content of alkyl acrylate constituting the core is low, rubber content is low and impact resistance is decreased, and when the content thereof is excessively high, shell content is low, the rubber clumps, and enhancement effect of impact resistance is deteriorated due to decreased compatibility with resins and refractive index is thus decreased.

It is preferable that a difference in refractive index ($\mu D^{25}$) between each of the seed and the shell, and the matrix polymer is 0.05 or less, in view of coloring property since transparency is imparted to an impact resistance enhancer.

Meanwhile, the graft copolymer preferably has a core thickness (the shortest distance from an outer surface of the seed to an outer surface of the core) of 20 to 50 nm and a thickness from the center to the core, of 75 to 175 nm (a size of particles including the seed and the core of 150 to 350 nm) in view of balance maintenance between impact resistance and coloring property. As can be seen from the examples given below, when the thicknesses of seed, core and shell defined above are satisfied, the thickness of the core which has a great difference with thickness of the matrix part is decreased, and a refractive index is reduced, core size is suitably controlled, transparency is provided, and coloring property is thus considerably improved.

Furthermore, the aromatic vinyl compound used for the seed and the shell comprises at least one selected form the group consisting of styrene monomer derivatives of styrene, α-styrene, p-styrene and vinyl toluene.

In addition, the vinyl cyan compound that may be used for the seed and the shell may be acrylonitrile, methacrylonitrile, or a mixture thereof.

In one embodiment, the alkyl (meth)acrylate compound that may be used for the seed comprises at least one selected from the group consisting of methyl acrylate, ethyl acrylate, propyl acrylate, butyl acrylate, 2-ethyl hexyl acrylate, methyl methacrylate, ethyl methacrylate, propyl methacrylate, 2-ethyl hexyl methacrylate, methyl ethacrylate, and ethyl ethacrylate.

In another embodiment, the alkyl (meth)acrylate compound comprises at least one selected from the consisting of methyl (meth)acrylate ester, ethyl (meth)acrylate ester, propyl (meth)acrylate ester, 2-ethylhexyl (meth)acrylate ester, decyl (meth)acrylate ester, and lauryl (meth)acrylate ester.

In particular, the shell according to the present invention comprises at least one crosslinking agent. For reference, the crosslinking agent may be contained in the seed and/or the core described above.

The crosslinking agent comprises at least one selected from the group consisting of divinylbenzene, 3-butanediol diacrylate, 1,3-butanediol dimethacrylate, 1,4-butanediol diacrylate, 1,4-butanediol dimethacrylate, aryl acrylate, aryl methacrylate, trimethylol propane triacrylate, tetraethylene glycol diacrylate, ethylene glycol dimethacrylate, diethylene glycol dimethacrylate, triethylene glycol dimethacrylate, neopentyl glycol dimethacrylate, triaryl isocyanurate, triarylamine, and diarylamine.

The crosslinking agent is for example a cross-linking vinyl compound.

The crosslinking agent is for example used in an amount of 0.1 to 10 parts by weight, 0.1 to 7 parts by weight, 0.5 to 6 parts by weight, or 1 to 4 parts by weight, based on 100 parts by weight of the total weight of monomers used for preparation of the ASA-based graft copolymer.

In addition, the shell is for example present in an amount of 20 to 60 parts by weight, 30 to 50 parts by weight or 30 to 40 parts by weight, based on 100 parts by weight of the total weight of monomers constituting the ASA-based graft copolymer. When the content of the shell is low, graft efficiency is deteriorated, the rubber clumps, compatibility with resins is decreased and enhancement effect of impact resistance is deteriorated, and when the content of the shell is excessively high, impact resistance efficiency is disadvantageously deteriorated due to decrease in relative content of rubber.

Alternatively, the shell may further comprise at least one selected from the group consisting of alkyl methacrylate and alpha-methyl styrene in order to control polymerization reactivity and refractive index to desired levels.

The gel content of the ASA graft copolymer is for example higher than 85%, 86 to 98%, 92 to 98%, or 94 to 97%, and a swelling index thereof is lower than 8, or of 2 to 7. When the gel content is out of the range defined above, impact resistance is deteriorated, and when the swelling index is within the range defined above, aggregation property, impact strength and thermal stability are excellent.

Furthermore, for example, the difference in refractive index ($\mu D^{25}$) between each of the seed and the shell, and the matrix polymer is 0.05 or less, and the difference in refractive index ($\mu D^{25}$) between the core and the matrix polymer is 0.05 to 0.15, or 0.07 to 0.14. The matrix resin that can be used in the present invention for example comprises at least one selected from polycarbonate, a polycarbonate/acrylonitrile-styrene alloy, a polycarbonate/polybutylene terephthalate alloy and a vinyl chloride resin. For example, the matrix resin is particularly preferably a polycarbonate resin (PC) since the ASA graft copolymer having a tri-layer structure according to the present invention has a high refractive index, thus reducing a difference in refractive index with the target matrix polymer.

A difference in refractive index ($\mu D^{25}$) between each of the seed and the shell, and the matrix polymer is preferably lower than 0.06 or is 0.05 or less in view of coloring property, since transparency is imparted to the graft copolymer. When the difference in refractive index ($\mu D^{25}$) between each of the seed and the shell, and the matrix polymer is larger than 0.05 or 0.07 or more, improvement effect of coloring property is considerable.

The ASA graft copolymer of the present invention may be for example an impact resistance enhancer for matrix copolymers.

The ASA graft copolymer of the present invention may be used for example in an amount of 0.5 to 20 parts by weight, with respect to 80 to 99.5 parts by weight of at least one matrix polymer selected from polycarbonate, a polycarbonate/acrylonitrile-styrene alloy, a polycarbonate/polybutylene terephthalate alloy and a vinyl chloride resin.

The ASA graft copolymer of the present invention may be for example prepared by the following three steps. The content of the ASA graft copolymer is based on 100 parts by weight of the total weight of monomers used for preparation of acrylonitrile-styrene-acrylate copolymers.

First, in the first step, the seed may be prepared by polymerizing a monomer mixture comprising 4 to 30 parts by weight of at least one selected from an aromatic vinyl compound, a vinyl cyan compound and alkyl(meth)acrylate. The monomer mixture may for example further comprise 0.001 to 1 parts by weight of an electrolyte, 0.01 to 3 parts by weight of a crosslinking agent, 0.01 to 3 parts by weight of a polymerization initiator and 0.01 to 5 parts by weight of an emulsifying agent.

Then, in the second step, the core is, for example, prepared by polymerizing a monomer mixture comprising 20 to 80 parts by weight of an alkyl acrylate monomer and 0.01 to 3 parts by weight of a crosslinking agent in the presence of the seed. In addition, in the second step, the monomer mixture may further comprise, for example, 0.01 to 3 parts by weight of a polymerization initiator and 0.01 to 5 parts by weight of an emulsifying agent with respect to 100 parts by weight of the total weight of monomers used for preparation of the acrylate-styrene-acrylonitrile copolymer.

Then, in the third step, the shell may be prepared by polymerizing a monomer mixture comprising 0.1 to 5 parts by weight of a crosslinking agent and 10 to 70 parts by weight of at least one selected from the group consisting of an aromatic vinyl compound, a vinyl cyan compound and alkyl (meth)acrylate in the presence of the rubber core. Furthermore, in the third step, the monomer mixture may for example further comprise 0.01 to 3 parts by weight of a polymerization initiator, 0 to 3 parts by weight of a molecular weight modifier and 0.01 to 5 parts by weight of an emulsifying agent.

The ASA graft copolymer composition of the present invention may further comprise at least one additive selected from the group consisting of a flame retardant, a lubricant, an antimicrobial agent, a release agent, a nucleating agent, a plasticizer, a thermostabilizer, an anti-oxidant, a photostabilizer, a compatibilizer, a pigment, a dye and an inorganic additive, in an amount of 0.1 to 10 parts by weight, based on 100 parts by weight of the total weight of the ASA graft copolymer and the matrix polymer.

A molded article prepared from the ASA graft copolymer composition exhibits improved impact resistance, low-temperature impact resistance and coloring property and thus enhanced appearance, and superior thermal stability and is thus suitable for applications including automobile components, electric and electrical components or construction materials.

Advantageous Effects

Advantageously, the present invention provides an ASA graft copolymer composition obtained through control of refractive index and seed, core and shell layers, which maintains a general impact resistance, does not deteriorate coloring property due to refractive index of the seed similar to a refractive index of a target matrix, and exhibits superior appearance and thermal stability through suitable control of gel content and swelling index.

BEST MODE

EXAMPLE

Now, the present invention will be described in more detail with reference to the following examples. These examples are provided only to illustrate the present invention and should not be construed as limiting the scope and spirit of the present invention.

Example 1

An ASA graft copolymer composition was prepared by mixing 3 parts by weight of an acrylic graft copolymer which comprises 20 parts by weight of styrene as a seed, 45 parts by weight of butyl acrylate as a core, and 35 parts by weight of styrene-acrylonitrile (26 parts by weight of SM and 9 parts by weight of AN) and 3 parts by weight of divinylbenzene as a shell, and had a core size (particle diameter of the core including the seed) of 230 nm and a core thickness (shortest distance from an outer surface of the seed to an outer surface of the core) of 40 nm, 97 parts by weight of a polycarbonate resin, 0.2 parts by weight of a lubricant, 0.5 parts by weight of an anti-oxidant, 0.1 parts by weight of a UV stabilizer and 0.1 parts by weight of a pigment. For reference, SM means styrene monomer, AN means acrylonitrile monomer, MMA means methyl methacrylate, BA means butyl acrylate, and 2-EHA means 2-ethyl hexyl acrylate.

A difference in refractive index between each of the seed and the shell of the acrylic graft copolymer, and the polycarbonate resin was smaller than 0.02 and a difference in refractive index between the core and the matrix was 0.13, and an acrylic graft copolymer had a gel content of 96% and a swelling index of 5.

Example 2

An ASA graft copolymer composition was prepared in the same manner as in Example 1, except that the seed comprised styrene-acrylonitrile-methyl methacrylate (15 parts by weight of SM, 3 parts by weight of AN, and 2 parts by weight of MMA), and the difference in refractive index between the seed and the matrix of the acrylic graft copolymer was smaller than 0.05. The acrylic graft copolymer had a gel content of 95% and a swelling index of 6.

Example 3

An ASA graft copolymer composition was prepared in the same manner as in Example 1, except that the seed comprised styrene-butyl acrylate (17 parts by weight of SM and 3 parts by weight of BA), and the difference in refractive index between the seed and the matrix of the acrylic graft copolymer was smaller than 0.05. The acrylic graft copolymer had a gel content of 96% and a swelling index of 6.

Example 4

An ASA graft copolymer composition was prepared in the same manner as in Example 1, except that the seed comprised styrene-acrylonitrile (15 parts by weight of SM and 15 parts by weight of AN), and the difference in refractive index between the seed of the acrylic graft copolymer and the matrix was smaller than 0.05. The acrylic graft copolymer had a gel content of 97% and a swelling index of 5.

Example 5

An ASA graft copolymer composition was prepared in the same manner as in Example 1, except that the seed comprised styrene-acrylonitrile-butyl acrylate (15 parts by weight of SM, 4 parts by weight of AN, and 1 parts by weight of BA) and the difference in refractive index between the seed and the matrix of the acrylic graft copolymer was smaller than 0.05. The acrylic graft copolymer had a gel content of 98% and a swelling index of 4.

Example 6

An ASA graft copolymer composition was prepared in the same manner as in Example 1, except that the core comprised butyl acrylate-2-ethyl hexyl acrylate (15 parts by weight of BA and 5 parts by weight of 2-EHA) and the difference in refractive index between the core of the acrylic graft copolymer and the matrix was smaller than 0.135. The acrylic graft copolymer had a gel content of 92% and a swelling index of 7.

Example 7

An ASA graft copolymer composition was prepared in the same manner as in Example 1, except that 15 parts by weight of the acrylic graft copolymer, 70 parts by weight of the polycarbonate resin (refractive index=1.59) and 15 parts by weight of acrylonitrile-styrene (refractive index=1.57) were mixed with 0.5 parts by weight of the lubricant, 0.5 parts by weight of the anti-oxidant and 0.5 parts by weight of the UV stabilizer and 0.1 parts by weight of the pigment.

Example 8

An ASA graft copolymer composition was prepared in the same manner as in Example 1, except that 7 parts by weight of the acrylic graft copolymer and 93 parts by weight of an polycarbonate/polybutylene terephthalate alloy (refractive index of polybutylene terephthalate=1.58) were mixed with 0.2 parts by weight of the lubricant, 0.2 parts by weight of the anti-oxidant, 0.2 parts by weight of the UV stabilizer and 0.1 parts by weight of the pigment.

Example 9

An ASA graft copolymer composition was prepared in the same manner as in Example 1, except that a master batch comprising 95 parts by weight of a polyvinyl chloride resin (refractive index=1.54), 2.0 parts by weight of the lubricant, 5 parts by weight of calcium carbonate, 4 parts by weight of the thermostabilizer, 1 part by weight of a processing aid, and 4 parts by weight of titanium oxide was mixed with 5 parts by weight of the acrylic graft copolymer.

Example 10

An ASA graft copolymer composition was prepared in the same manner as in Example 1, except that the acrylic graft copolymer had a core size of 300 nm and a core thickness of nm. The prepared acrylic graft copolymer had a gel content of 95% and a swelling index of 5.

Example 11

An ASA graft copolymer composition was prepared in the same manner as in Example 1, except that the acrylic graft copolymer had a core size of 260 nm and a core thickness of 40 nm. The prepared acrylic graft copolymer had a gel content of 95% and a swelling index of 5.

Comparative Example 1

An ASA graft copolymer composition was prepared in the same manner as in Example 1, except that a final acrylic graft copolymer comprised 4 parts by weight of styrene as the seed, 55 parts by weight of butyl acrylate as the core, and 41 parts by weight of styrene-acrylonitrile (31 parts by weight of SM and 10 parts by weight of AN) and 5 parts by weight of divinylbenzene as the shell, and had a core size of 270 nm and a core thickness of 70 nm and a gel content of 97% and a swelling index of 4.

Comparative Example 2

An ASA graft copolymer composition was prepared in the same manner as in Example 1, except that a final acrylic graft copolymer comprised 30 parts by weight of styrene as the seed, 40 parts by weight of butyl acrylate as the core, and 30 parts by weight of styrene-acrylonitrile (23 parts by weight of SM and 7 parts by weight of AN) and 3 parts by weight of divinylbenzene as the shell, and had a core size of 130 nm and a core thickness of 20 nm and a gel content of 94% and a swelling index of 6.

Comparative Example 3

An ASA graft copolymer composition was prepared in the same manner as in Example 1, except that a final acrylic graft copolymer comprised 10 parts by weight of styrene as the seed, 50 parts by weight of butyl acrylate as the core, and 40 parts by weight of styrene-acrylonitrile (30 parts by weight of SM and 10 parts by weight of AN) and 4 parts by weight of divinylbenzene as the shell, had a core size of 230 nm and a core thickness of 0 nm (unclear distinguishment between layers) and a gel content of 96% and a swelling index of 4.

Comparative Example 4

An ASA graft copolymer composition was prepared in the same manner as in Example 1, except that the seed comprised styrene-butyl acrylate (10 parts by weight of SM and 10 parts by weight of BA), and the difference in refractive index between the seed and the matrix of the acrylic graft copolymer was smaller than 0.06 (other physical property values are the same as in Example 1 and hereinafter, the same will be applied).

Comparative Example 5

An ASA graft copolymer composition was prepared in the same manner as in Example 1, except that the core comprised butyl acrylate-styrene (12 parts by weight of SM and 8 parts by weight of BA), and the difference in refractive index between the seed of the acrylic graft copolymer and the matrix was smaller than 0.05.

Comparative Example 6

An ASA graft copolymer composition was prepared in the same manner as in Example 1, except that divinylbenzene was not used for production of the shell and the acrylic graft copolymer had a gel content of 85% and a swelling index of 8.

Comparative Example 7

An ASA graft copolymer composition was prepared in the same manner as in Example 1, except that a final acrylic graft copolymer comprised 4 parts by weight of styrene as the seed, 55 parts by weight of butyl acrylate as the core, and 41 parts by weight of styrene-acrylonitrile (31 parts by weight of SM and 10 parts by weight of AN, and divinylbenzene was not comprised) as the shell, and had a core size of 270 nm, a core thickness of 40 nm, a gel content of 87% and a swelling index of 8.

Comparative Example 8

An ASA graft copolymer composition was prepared in the same manner as in Example 8, except that a final acrylic graft copolymer comprised 4 parts by weight of styrene as the seed, 55 parts by weight of butyl acrylate as the core, and 41 parts by weight of styrene-acrylonitrile (31 parts by weight of SM and 10 parts by weight of AN, and divinylbenzene was not comprised) and 5 parts by weight of divinylbenzene as the shell, and had a core size of 270 nm, a core thickness of 40 nm, a gel content of 87% and a swelling index of 8.

Comparative Example 9

An ASA graft copolymer composition was prepared in the same manner as in Example 9, except that a final acrylic graft copolymer comprised 4 parts by weight of styrene as the seed, 55 parts by weight of butyl acrylate as the core, and 41 parts by weight of styrene-acrylonitrile (31 parts by weight of SM and 10 parts by weight of AN, and divinylbenzene was not comprised), and had a core size of 270 nm, a core thickness of 40 nm, a gel content of 87% and a swelling index of 8.

Properties of the ASA graft copolymer composition were measured by the following methods.

(1) Refractive index: a powder was compressed and a refractive index thereof was measured using a refractometer (Metricon 2010).

(2) Mean particle diameter of seed/core/shell: mean particle diameter of latex was measured by a dynamic laser light scattering method using a NICOMP 380 particle size analyzer. Intensity was measured in a Gaussian measurement mode.

(3) Izod impact strength (⅛" notched at 23° C., kgf·cm/cm): measured in accordance with an ASTM D-256 method.

(4) Resin coloring property: during resin processing, 0.1 wt % of carbon black was added and a value L of a specimen for measuring coloring property was measured using a color-difference meter. As the value of L decreased, black became darker which means that pigment coloring property became better.

(5) Thermal stability: in order to evaluate variation at a temperature which was 40° C. higher than a processing temperature for 20 minutes, variation in color (ΔE) was measured using a color-difference meter. ΔE represents an arithmetic mean value of a CIE Lab value before and after weather resistance testing. As ΔE approaches zero (0), thermal stability becomes better.

(6) Gel content and swelling index: acetone was added to 1 g of an ASA graft copolymer powder, followed by stirring at room temperature for 24 hr and centrifuging. Only the component not-dissolved in acetone was collected and a weight thereof was measured before and after drying. Gel content and swelling index were obtained by the following Equations.

*Gel content(%)=Sample weight after centrifugation and drying/sample weight*100

Swelling index=Sample weight after centrifugation and before drying/sample weight after centrifugation and drying

TABLE 1

| | Impact strength (23° C.) | Impact strength (−30° C.) | Coloring property | Thermal stability |
|---|---|---|---|---|
| Ex. 1 | 90 | 25 | 26.1 | 2.7 |
| Ex. 2 | 89 | 23 | 26.5 | 2.7 |
| Ex. 3 | 92 | 28 | 26.8 | 2.5 |
| Ex. 4 | 91 | 26 | 26.4 | 2.8 |
| Ex. 5 | 90 | 27. | 26.9 | 2.4 |
| Ex. 6 | 93 | 32 | 26.9 | 2.5 |
| Ex. 7 | 78 | 35 | 27.0 | 3.1 |
| Ex. 8 | 68 | 40 | 26.5 | 2.4 |
| Ex. 9 | 140 | 74 | — | 3.5 |
| Ex. 10 | 93 | 27 | 26.3 | 2.8 |
| Ex. 11 | 95 | 29 | 26.2 | 2.7 |
| Comp. Ex. 1 | 95 | 28 | 28.8 | 2.9 |
| Comp. Ex. 2 | 65 | 11 | 26.3 | 3.3 |
| Comp. Ex. 3 | 92 | 28 | 29.6 | 2.6 |
| Comp. Ex. 4 | 89 | 27 | 28.5 | 2.7 |
| Comp. Ex. 5 | 52 | 7 | 26.3 | 2.6 |
| Comp. Ex. 6 | 76 | 16 | 27.6 | 5.2 |
| Comp. Ex. 7 | 65 | 28 | 30.3 | 5.9 |
| Comp. Ex. 8 | 62 | 36 | 28.9 | 4.7 |
| Comp. Ex. 9 | 129 | 61 | — | 6.6 |

As can be seen from Table 1, when Examples 1 to 11 were compared with Comparative Examples regarding physical properties such as room-temperature and low-temperature impact strength, while taking into consideration physical properties of the matrix polymer used, Examples 1 to 11 exhibited similar or superior room-temperature and low-temperature impact strength, excellent coloring property and superior thermal stability.

Meanwhile, as can be seen from Table 1, Comparative Examples 3 and 4 exhibited a deterioration in coloring property when refractive indexes of the seed and the matrix were not suitable, and Comparative Example 5 exhibited a deterioration in impact strength when styrene having a high refractive index was used as the core.

In addition, it can be seen that impact strength and thermal stability were deteriorated when gel content was not suitable (Comparative Examples 6 to 9), since a crosslinking agent was not used for shell polymerization.

What is claimed is:

1. An ASA graft copolymer composition comprising:
    an ASA graft copolymer comprising a seed, a core and a shell; and
    a matrix polymer,
    wherein the ASA graft copolymer has a gel content higher than 85% and a swelling index lower than 8, a difference in refractive index ($\mu D^{25}$) between the seed of the ASA graft copolymer and the matrix polymer is lower than 0.06, a difference in the refractive index ($\mu D^{25}$) between the core of the ASA graft copolymer and the matrix polymer is higher than 0.05, and a difference in refractive index ($\mu D^{25}$) between the shell and the matrix polymer is 0.05 or less,
    wherein the matrix polymer is at least one selected from the group consisting of polycarbonate resin, acrylonitrile-styrene copolymer, polyester resin and vinyl chloride resin,
    wherein a weight ratio of the ASA graft copolymer to the matrix polymer is 1:99 to 20:80,
    wherein the core has a thickness of 20 to 50 nm,
    wherein the core has a size of 230 to 350 nm, and
    wherein the shell of the ASA graft copolymer comprises an aromatic vinyl compound, a vinyl cyan compound and a crosslinking agent.

2. The ASA graft copolymer according to claim 1, wherein a weight ratio of the seed, the core and the shell is 5 to 40:20 to 60:20 to 60, repectively.

3. The ASA graft copolymer according to claim 1, wherein the crosslinking agent is selected from the group consisting of divinylbenzene, 3-butanediol diacrylate, 1,3-butanediol dimethacrylate, 1,4-butanediol diacrylate, 1,4-butanediol dimethacrylate, aryl acrylate, aryl methacrylate, trimethylol propane triacrylate, tetraethylene glycol diacrylate, ethylene glycol dimethacrylate, diethylene glycol dimethacrylate, triethylene glycol dimethacrylate, neopentyl glycol dimethacrylate, triallyl isocyanurate, triarylamine, and diallylamine.

4. The ASA graft copolymer according to claim 1, wherein the crosslinking agent is present in an amount of 0.1 to 10 parts by weight, based on 100 parts by weight of the total weight of monomers of the ASA-based graft copolymer.

5. The ASA graft copolymer according to claim 1, further comprising: at least one additive selected from the group consisting of a flame retardant, a lubricant, an antimicrobial agent, a release agent, a nucleating agent, a plasticizer, a thermostabilizer, an anti-oxidant, a photostabilizer, a compatibilizer, a pigment, a dye and an inorganic additive.

6. A molded article prepared from the ASA graft copolymer composition according to claim 1.

7. The molded article according to claim 6, wherein the molding article is selected from the group consisting of an automobile component, an electric or electrical component or a construction material.

* * * * *